Figure 1:
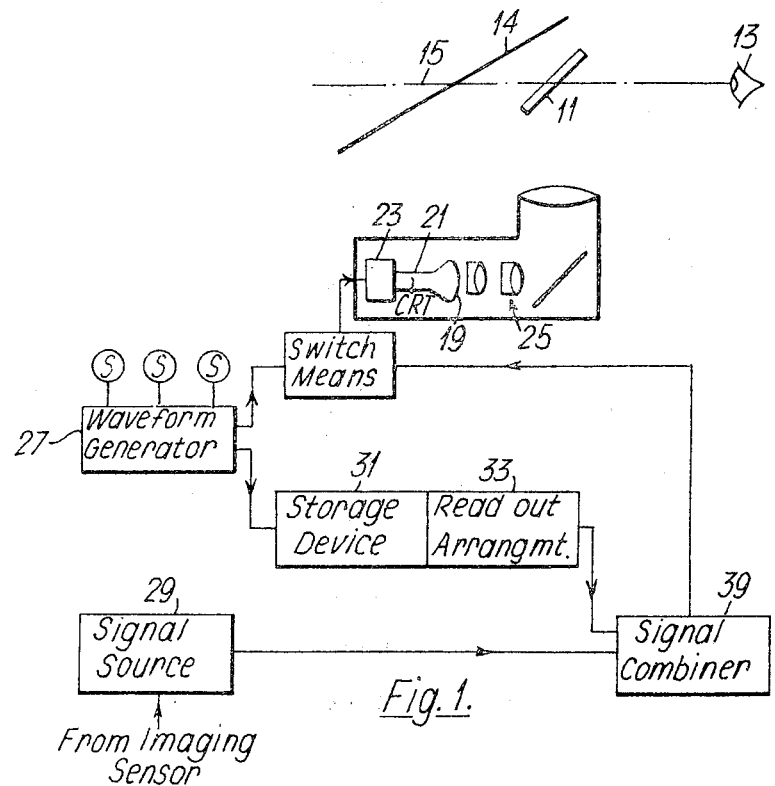

United States Patent [19]
Bull

[11] 3,932,861
[45] Jan. 13, 1976

[54] VEHICLE HEAD-UP DISPLAY SYSTEMS

[75] Inventor: George Carter Bull, East Malling, England

[73] Assignee: Elliott Brothers (London) Limited, Essex, England

[22] Filed: Apr. 29, 1974

[21] Appl. No.: 464,739

[30] Foreign Application Priority Data
Apr. 30, 1973 United Kingdom............... 20399/73

[52] U.S. Cl........................... 340/324 AD; 340/27 R
[51] Int. Cl.²............................................ G06F 3/14
[58] Field of Search.................... 340/324 AD, 27 R

[56] References Cited
UNITED STATES PATENTS

| | | | |
|---|---|---|---|
| 2,702,356 | 2/1955 | Flory................................ | 340/324 A |
| 2,994,077 | 7/1961 | Terhune........................... | 340/324 A |
| 3,230,819 | 1/1966 | Noxon............................... | 340/27 R |
| 3,299,205 | 1/1967 | Stavis............................... | 340/324 A |
| 3,763,486 | 10/1973 | Hankins et al.................... | 340/324 A |

Primary Examiner—Marshall M. Curtis
Attorney, Agent, or Firm—Kirschstein, Kirschstein, Ottinger & Frank

[57] ABSTRACT

A vehicle (e.g. aircraft) head-up display system having the capability of displaying, superimposed on an observer's view of the scene outside the vehicle, symbols representing information required by an observer in the vehicle, together with a pictorial representation of the vehicle environment produced by a signal source incorporating an imaging sensor. The signal source produces an output signal of raster scan format (e.g. a television type line-by-line scan format) and output signals of the same format representing the required symbols are developed by a storage/read out arrangement which stores the symbols in response to stroke writing mode signals and reads out the stored symbols in the same raster scan format as is employed by the signal source, the raster scan outputs of the storage/read out arrangement and the signal source being combined for application to the display unit of the system.

3 Claims, 2 Drawing Figures

VEHICLE HEAD-UP DISPLAY SYSTEMS

This invention relates to head-up display systems, particularly for use in aircraft.

As is well known, a head-up display system consists of a semi-reflective combiner arranged in the line of sight of an observer, a display device, usually a cathode ray tube, for displaying information required by the observer and a collimating optical system for projecting the displayed information from the display device to the combiner. Thus the observer sees the displayed information against the background of the scene outside the aircraft. For the displayed information to be sufficiently bright to be visible against the high ambient light conditions normally pertaining outside an aircraft, the display device operates in a stroke writing mode. However, it is sometimes desirable to use the display device to display a pictorial representation of the enviroment as may be developed from an imaging sensor such as an infra red device or a low light television device. The outputs signals developed by such devices are of raster scan format and therefore it is not possible to display the normal information and the environmental representation at the same time.

It is an object of this invention to provide a head-up display system in which it is possible to display both types of information simultaneously.

According to the invention, a head-up display system for a vehicle comprises:
a. a semi-reflective image combiner element adapted to be installed in the vehicle in front of an observer on the line of sight of the observer forward of the vehicle;
b. a display surface;
c. activating means operable to activate substantially any portion of the said surface so as to cause the said portion to emit light;
d. between the combiner element and the display surface, a collimating optical system which, when a display is present on the display surface as a result of activation as aforesaid, projects a collimated image of the display to the combiner element for reflection to the abserver's eyes;
e. a waveform generator responsive to input data signals derived from sensors carried by the vehicle and representing the relationship of the vehicle to its environment so as to repetitively develop a time sequence of output signals capable of being employed for controlling the activating means to activate desired line segments of the display surface thereby to present at said surface symbols representative of the aforesaid relationship;
f. a signal source operable to develop a raster scan output signal representative of the environment sensed by an imaging sensor;
g. a symbol storage device operable in response to output signals from the waveform generator so as to store symbols to be presented at the display surface;
h. a symbol read-out arrangement operable to develop a raster scan output signal representative of the symbols stored in the symbol storage device, said output signal having the same format as the signal source output signal;
i. signal combiner circuitry operable to receive the output signals from the signal source and the symbol read-out arrangement so as to develop a raster scan output signal representative of both said symbols and said environment; and
j. means for connecting either the output of the signal combiner circuitry or the output of the waveform generator to the activating means.

In a preferred arrangement in accordance with the invention said symbol storage device and symbol read out arrangement are combined to comprise an arrangement including two single-ended storage tubes connected and arranged such that in operation, one operates in storage mode for one period of time to store the output signal of the waveform generator, whilst the other operates in a reading mode to read out another part of the output signal of the waveform generator in accordance with the raster scan format of the output of said signal source, which other part had previously been stored in said other single-ended tube during an earlier period of time.

By "single-ended storage tube" is meant a storage tube in which storage and reading are accomplished by the same electron gun and the same deflection system.

Figure 2:
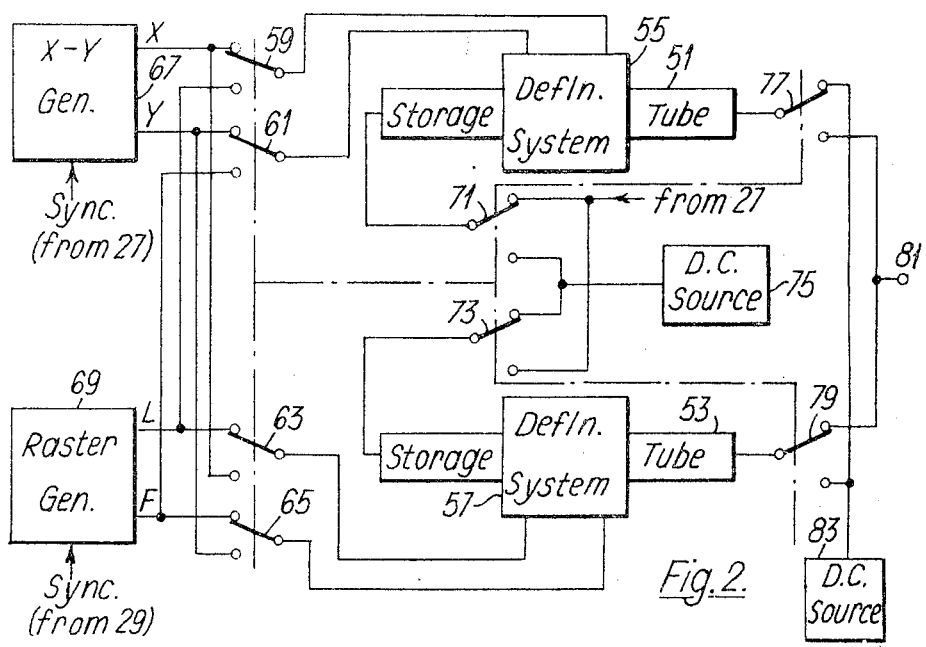

The invention is hereinafter described with reference to the accompanying drawing in which:

FIG. 1 is a synoptic diagram of a head-up display system installed in an aircraft; and FIG. 2 is a schematic diagram of part of the system.

The system comprises a semi-reflective image combiner element 11 installed in the aircraft in front of the pilot 13 on the pilot's line of sight 15 forward of the aircraft. The aircraft windshield is depicted by the reference numeral 17.

There is a primary display surface 19 which is constituted by the phosphor screen of a cathode ray tube (crt) 21. The activating means 23 for the phosphor screen comprises an electron gun (not shown) for directing an electron beam at the crt screen and deflection and bright-up circuitries (not shown) therefor operable to deflect and modulate the electron beam intensity so as to excite any desired portion of the phosphor screen to emit light.

Between the combiner element 11 and the phosphor screen there is a collimating optical system indicated, generally, at 25. The light emitted from the phosphor screen is transmitted collimated to the combiner element 11 from which it is reflected to the pilot's eyes. The light being collimated, the image reflected to the pilot is focussed at infinity ie. is focussed on the distant scene transmitted through the semi-reflective combiner element.

A waveform generator 27 receives input data signals from sensors S carried by the aircraft and representing the relationship of the aircraft to its environment in space or time or in both space and time. The waveform generator 27 is responsive to the sensor signals so as to develop a stroke writing mode video output signal capable of being employed in controlling the activating means 23 so as to cause the activating means to excite desired line segments of the phosphor screen of the crt so as to present at the screen symbols representative of the aforesaid relationship of the aircraft to its environment. Such waveform generators are well known and the development thereof is described in articles such as "The Evolution of Head-Up Displays", published in "Interavia" (August 1972) and "Cost Conscious Weapon-aiming HUD" published in "Flight" (8th June 1972).

The sensors may comprise or include such instruments as gyros, accelerometers and air data sensors;

the range of sensors chosen is determined by the characteristics of the display to be presented to the pilot in accordance with the operational requirement of the aircraft.

The system further includes a signal source 29 including an imaging sensor. The source 29 is operable to develop a raster scan video output signal representing the environment of an imaging sensor which may or may not be on the aircraft. The imaging sensor may comprise an infra-red sensor or a low-light television sensor. The scan output signal typically has a line by line scan format similar to that used in television systems; but if desired the raster scan video output signal could have any other format eg. $r, \theta$. Such signal source and sensors are well known and examples thereof are described in articles such as "Developments in U.S. Military Reconnaisance" published in "Interavia" (April 1972), and "New Sensors For Airborne Reconnaisance" published in "Interavia" (May 1972).

A symbol storage device 31 is operable in response to output signals from the waveform generator 27 so as to store a representation of symbols to be presented to the pilot. Associated with the device 31 there is a symbol read-out arrangement 33 operable to cyclically scan the symbol storage device 31 in a raster so as to develop a raster scan output signal characteristic of the symbols and their spatial distribution on the symbol storage device 31 and of the same format as the output signal of the signal source 29.

A signal combiner circuitry 39 receives the output of the signal source 29 and optionally the output of the symbol read-out arrangement 33. It produces a raster scan output signal corresponding to the output of the signal source or a composite of the outputs of both the signal source 29 and the symbol read-out arrangement 33 depending on whether the output of the symbol read-out arrangement is or is not required to be presented with the output of the signal source 29.

Switch means 41 is provided for connecting either the output of the signal combiner circuitry 39 or the output of the waveform generator 27 to the activating means so that the image presented to the pilot at the combiner element 11 consists either of symbols produced by light emitted from excited line segments of the crt phosphor screen in response to the output of generator 27 or light emitted from the phosphor screen in response to the raster scan output signal of the combiner circuitry 39.

If desired a displaceable blind may be provided between the combiner element and the windshield 17 to provide a dark background for the relatively low brightness display produced from the output of the signal combiner 39. The blind may be as described in United Kingdom patent applications 20398/73 and 24527/73. Where the signal source is of the kind adapted to produce a pictorial representation of the aircraft environment for night flying use, such a blind is clearly unnecessary.

Preferably, the symbol storage device 31 and the symbol read-out arrangement 33 are combined in an arrangement as described in U.K. Patent Specification No. 1,315,624.

Referring now to FIG. 2, the arrangement suitably comprises two single-ended storage tubes 51 and 53 having respective electron beam deflection systems 55 and 57.

The deflection system 55 and 57 are supplied via four ganged change-over switches 59, 61, 63 and 65 with X and Y co-ordinate deflection signals from a generator 67 synchronised with the output of waveform generator 27 and with field and line scanning signals from a rectangular raster generator 69 synchronised with the output of the signal source 29 so that in one position of the switches the deflection system 55 and 57 receive signals from the generators 67 and 69 respectively and in the other position of the switches the deflection system 55 and 57 receive signals from the generators 69 and 67 respectively.

The beam control electrodes (not shown) of the storage tubes are connected via two further change-over switches 71 and 73 with the stroke writing mode video output signal from the generator 27 and with a source 75 of d.c. potential of a value such as to set the storage tube to whose beam control electrode it is applied in a reading mode. The switches 71 and 73 are so connected and ganged with the switches 59 to 65 so that the video output of the generator 27 is applied to the storage tube whose deflection system is receiving signals from the generator 67 and the d.c. potential is applied to the other storage tube.

The targets of the storage tubes are connected via two further change-over switches 77 and 79 to an output terminal 81 and a further source 83 of d.c. potential of a value such as to set the storage tube to whose target electrode it is applied in a storage mode.

In operation, the switches are operated at the end of each rectangular raster field period. Thus, during each field period one of the tubes operates in a storage mode to store on its target the stroke writing mode signal applied to it from the waveform generator 27 whilst the other operates in a reading mode to read out from its target, in accordance with a raster scan format, the signal applied to it from the waveform generator 27 during the previous field period. Thus the stroke writing mode output signal of the waveform generator 27 appears at the terminal 81 in a raster scan format corresponding to the raster scan format of the output of the signal source 29.

I claim:
1. A head-up display system for a vehicle comprising:
   a. a semi-reflective combiner element adapted to be installed in the vehicle on the line of sight of an observer in the vehicle of a scene outside the vehicle;
   b. a display surface;
   c. activating means operable to activate substantially any portion of the said surface so as to cause the said portion to emit light;
   d. between the combiner element and the display surface a collimating optical system which, when a display is present on the display surface as a result of activation as aforesaid, projects a collimated image of the display to the combiner element for reflection to the observer's eyes, thereby effectively superimposing the image of the display on the observer's view of the outside scene through the combiner;
   e. a waveform generator responsive to input data signals derived from sensors carried by the vehicle and representing the relationship of the vehicle to its environment so as to repetitively develop a time sequence of output signals capable of being employed for controlling the activating means to activate desired line segments of the display surface thereby to present at said surface symbols representative of the aforesaid relationship;

f. a signal source operable to develop a raster scan output signal representative of the environment sensed by an imaging sensor;
g. a symbol storage device operable in response to output signals from the waveform generator so as to store symbols to be presented at the display surface;
h. a symbol read-out arrangement operable to develop a raster scan output signal representative of the symbols stored in the symbol storage device, said output signal having the same format as the signal source output signal;
i. signal combiner circuitry operable to receive the output signals from the signal source and the symbol read-out arrangement so as to develop a raster scan output signal representative of both said symbols and said environment; and
j. means for connecting either the output of signal combiner circuitry or the output of the waveform generator to the activating means.

2. A head-up display system according to claim 1 in which said symbol storage device and symbol read-out arrangement are combined to comprise an arrangement including: two single-ended storage tubes; means for operating said two storage tubes in reading and storage modes alternately, one tube being in its reading mode when the other is in its storage mode and vice versa; means for supplying the output signal of the waveform generator together with deflection signals synchronized with the waveform generator to the storage tube operating in its storage mode; means for supplying scanning signals synchronized with the output of said signal source to the storage tube operating in its reading mode; and means for deriving an output signal from the storage tube operating in its reading mode.

3. A head-up display according to claim 1 in which the output signal of the signal source has a line by line scan format.

* * * * *